(12) United States Patent
Yeh

(10) Patent No.: US 7,491,105 B2
(45) Date of Patent: Feb. 17, 2009

(54) SLIDER WITH RESISTANCE TO EROSION AND WEAR

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 0 days.

(21) Appl. No.: 12/134,704

(22) Filed: Jun. 6, 2008

(65) Prior Publication Data

US 2008/0242169 A1 Oct. 2, 2008

Related U.S. Application Data

(63) Continuation of application No. 10/797,094, filed on Mar. 11, 2004, now Pat. No. 6,988,920, which is a continuation-in-part of application No. 10/386,634, filed on Mar. 13, 2003, now Pat. No. 6,955,576, which is a continuation-in-part of application No. 10/040,404, filed on Jan. 9, 2002, now abandoned.

(51) Int. Cl.
*B63B 1/00* (2006.01)
(52) U.S. Cl. .......................................... 441/65; 441/74
(58) Field of Classification Search ................. 114/357; 441/65, 70, 74
See application file for complete search history.

(56) References Cited

U.S. PATENT DOCUMENTS

| 6,955,576 | B2 * | 10/2005 | Yeh | 441/65 |
| 6,988,920 | B2 * | 1/2006 | Yeh | 441/65 |
| 7,063,769 | B2 * | 6/2006 | Cheung | 441/65 |
| 7,172,481 | B2 * | 2/2007 | Yeh | 441/65 |
| 7,246,568 | B1 * | 7/2007 | Cheung | 114/357 |
| 7,264,523 | B2 * | 9/2007 | Yeh | 441/65 |
| 7,326,094 | B2 * | 2/2008 | Yeh | 441/65 |
| 7,404,749 | B2 * | 7/2008 | Cheung | 441/74 |
| 7,416,461 | B2 * | 8/2008 | Yeh | 441/65 |

* cited by examiner

*Primary Examiner*—Lars A Olson
(74) *Attorney, Agent, or Firm*—Muncy, Geissler, Olds & Lowe, PLLC

(57) ABSTRACT

A slider resists erosion due to moisture, dirt and ultraviolet of sunlight and protects a pattern or the bonded surface from wear and tear. The slider contains a foam core, a top layer, a pattern, and a bottom layer. The foam core has a top surface, a bottom surface and edge surfaces. The top layer is a composite layer heat laminated to the top surface and edge surfaces of the foam core. The pattern is formed within the top layer and visible from outside of the top layer. The bottom layer is heat laminated to the bottom surface of the foam core.

12 Claims, 9 Drawing Sheets

SLIDER WITH RESISTANCE TO EROSION AND WEAR

CROSS REFERENCE TO RELATED APPLICATION

This is a continuation application of 10/797,094 now U.S. Pat. No. 6,988,920 filed on Mar. 11, 2004, which is a continuation-in-part of 10/386,634 now U.S. Pat. No. 6,955,576 filed on Mar. 13, 2003, which is a continuation-in-part of U.S. application Ser. No. 10/040,404 filed on Jan. 9, 2002, now abandoned.

BACKGROUND OF INVENTION

1. Field of Invention

This invention relates generally to a slider, used for sliding on snow, grass, sand or the like. The slider is a foam core to which layers are laminated to protect against erosion, wear and ultraviolet light. In the context of this specification, the slider is anyone of the embodiments. The slider is a bodyboard, a snow board, a snow sled, a grass sliding board, a sand sliding board, a surfing board or the like.

2. Related Prior Art

The slider of the prior art is a board made of plastic that has handles attached on the surface of the board and has a design printed in a central area of the board. The plastic is typically a hard plastic in order that the board could be wear resistant. However, the solid plastic board is generally not comfortable for the user and the board is also heavy for the users, especially children to carry. Besides, the design simply printed on the surface of the board is easily worn off due to the frequent contact with the user.

Another slider of the prior art is a board made of expanded foam. An outer film is generally laminated to a top surface of the foam board and several strips are laminated to edges of the foam board. The slider made of foam is more comfortable for the users to contact with and lighter for the users to carry with than a slider made of solid plastic. However, It is known that the ultraviolet damages of expanded foam; furthermore, the outer film and the strip also degrade under the sunshine after a period of time. Air-cells of the foam board fracture when abraded. Once the air-cells are broken, water retains in the open cells and erosion reduces the life of the slider. Furthermore, the design of a slider mostly is printed on the outer film and the strips; therefore, the design on the board deteriorates very quickly.

The designs or patterns on the sliders are convenient means for the owners to identify their sliders. Therefore, an enduring pattern of the slider performs a useful and decorative function.

SUMMARY OF INVENTION

It is a primary object of the invention to provide a slider whose surfaces resist accelerated erosion due to moisture, dirt and ultraviolet sunlight.

It is another object of the invention that a pattern imprinted on the slider resists wear and tear.

Another object of the invention is that the slider is comfortable to the touch.

In one embodiment, this invention discloses a slider comprising a foam core, a top layer, a pattern, and a bottom layer. The foam core has a top surface, a bottom surface and edge surfaces. The top layer is a composite layer heat laminated to the top surface and edge surfaces of the foam core. The pattern is formed within the top layer and is visible from outside of the top layer. The bottom layer is heat laminated to the bottom surface of the foam core.

In another embodiment, the top layer of this invention comprises an outer film, an inner film, a pattern, and a foam skin. The outer film has a top surface and a bottom surface on which the pattern is printed. The inner film has a top surface heat laminated to the bottom surface of the outer film and a bottom surface which is heat laminated to a top surface of the foam skin. A bottom surface of the foam skin is heat laminated to the top surface and edge surfaces of the foam core.

In a further embodiment, the bottom layer of this invention comprises a foam skin and a plastic board. The foam skin has a top surface, which is heat laminated to the bottom surface of the foam core and a bottom surface, which is heat laminated to the plastic board. The plastic board is a composite board and a pattern is printed within the plastic board.

Other features of the invention include bonding films that enable foam materials such as polystyrene to be heat laminated to polyethylene.

BRIEF DESCRIPTION OF DRAWINGS

The invention will be more clearly understood after referring to the following detailed description read in conjunction with the drawings wherein.

DETAILED DESCRIPTION OF THE INVENTION

Figure 1:
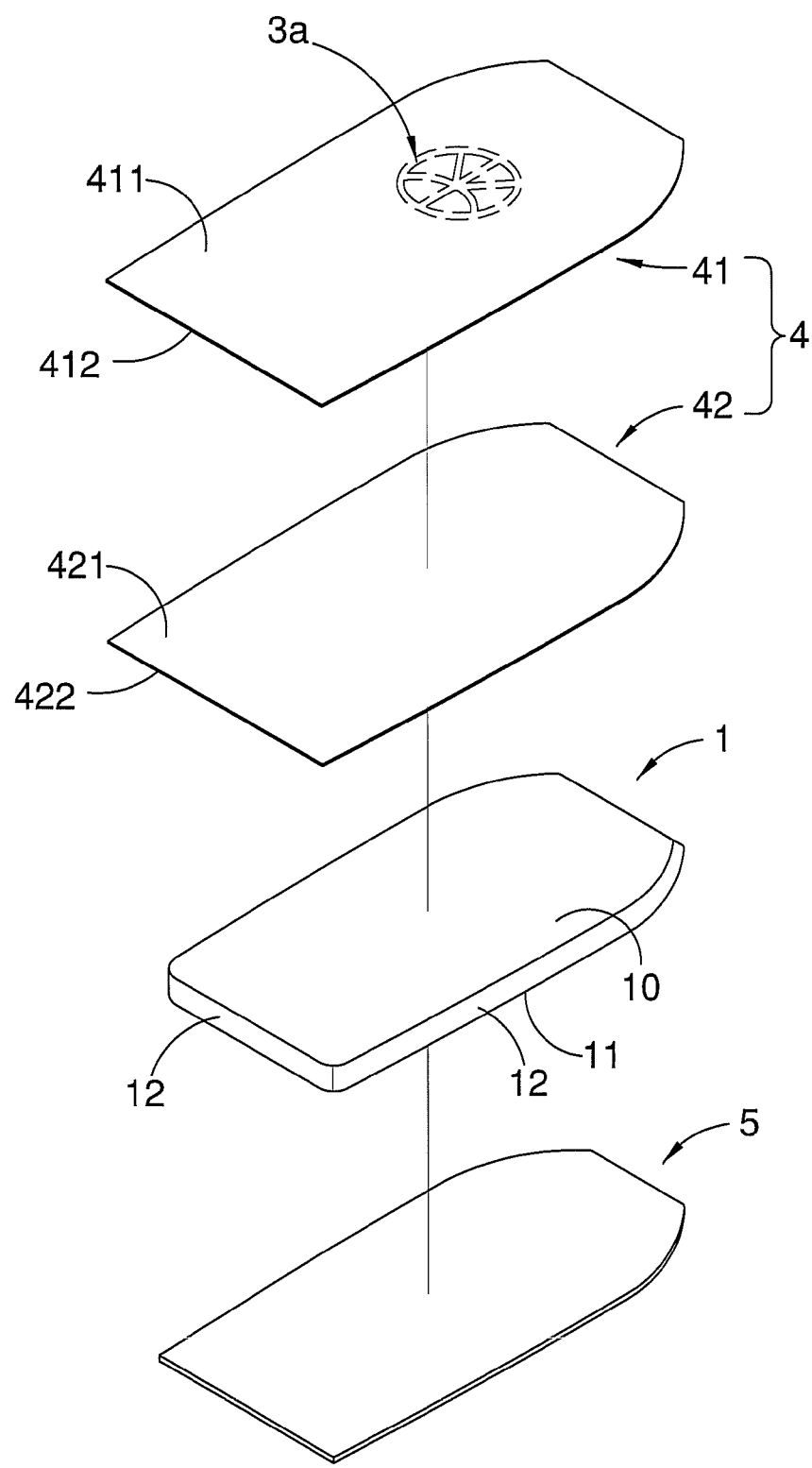
FIG. 1 is an exploded perspective view of a slider according to a first embodiment of the present invention.
Figure 2:
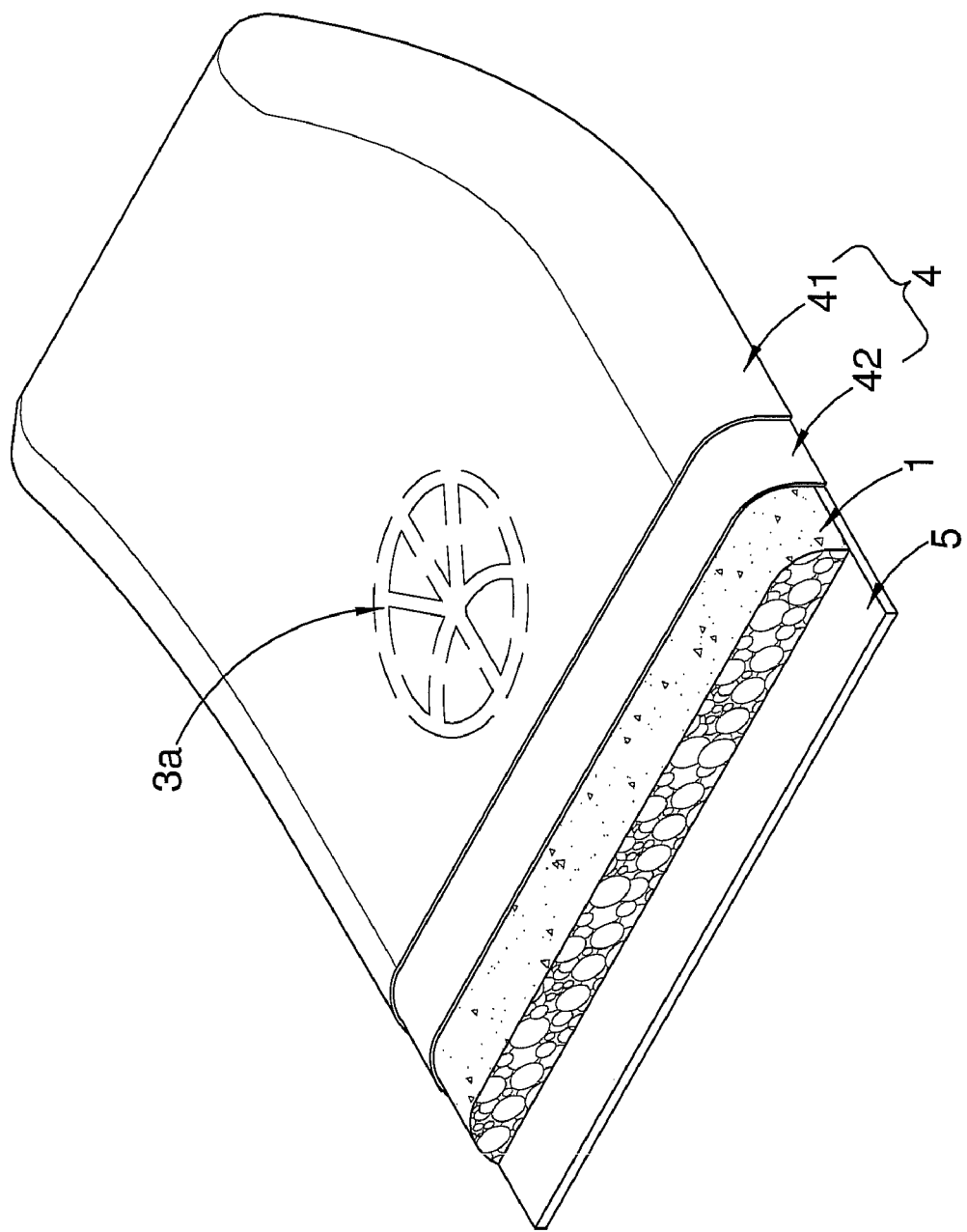
FIG. 2 is a cross sectional view of the slider of FIG. 1.
Figure 3:
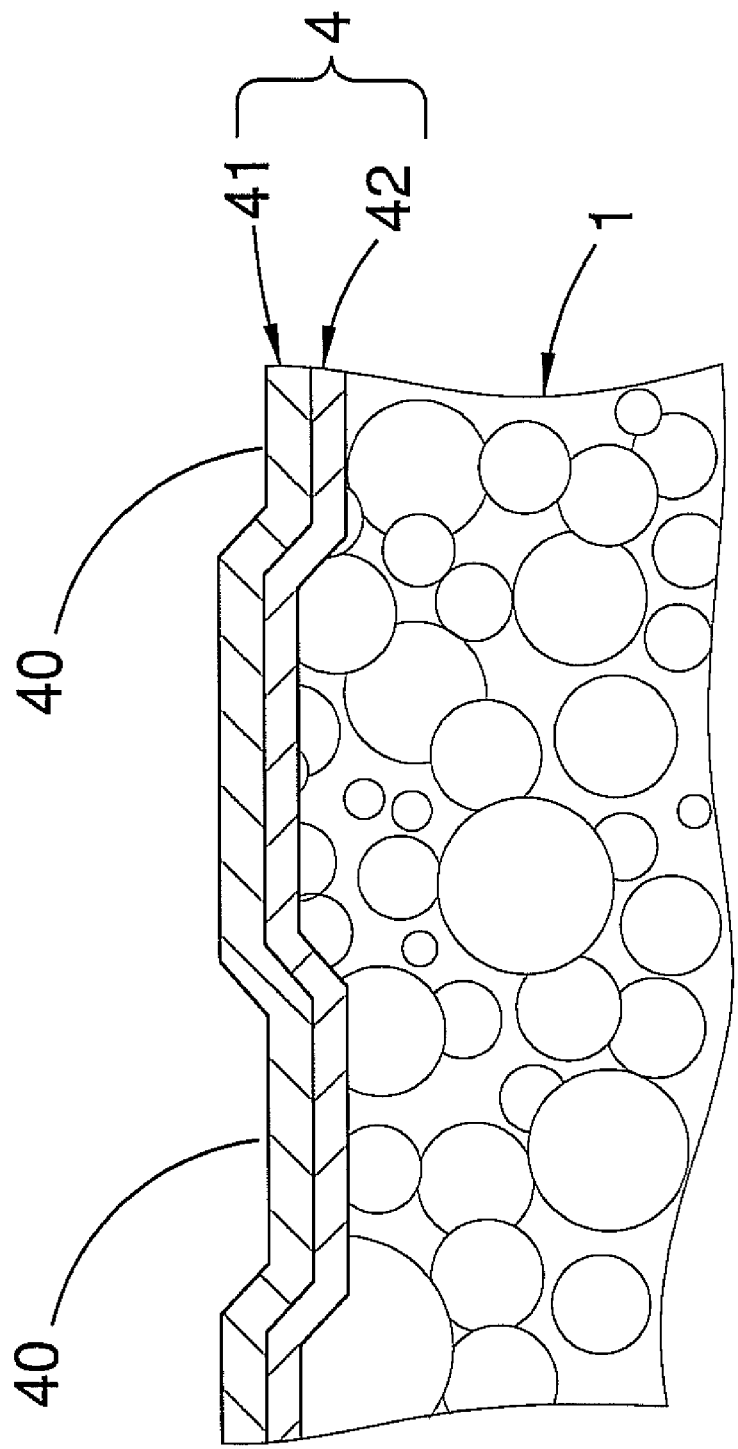
FIG. 3 is a regionally enlarged cross sectional view of the slider of FIG. 2.

With reference to FIGS. 1-3, a slider in accordance with a first embodiment of the present invention comprises a foam core 1, a top layer 4, and a bottom layer 5. The foam core 1 has a top surface 10, a bottom surface 11 and edge surfaces 12. The top layer 4 is heat laminated to the top surface 10 and edge surfaces 12 of the foam core 1, and the bottom layer 5 is heat laminated to the bottom surface 11 of the foam core 1.

The foam core 1 is made of polyethylene foam and has a density in the range of 1.2 to 8 PCF (pounds per cubic foot) so that the foam core 1 is light and flexible. In the first embodiment, the top layer 4 is a composite layer or a patterned laminate, which includes a first outer film 41, a first inner film 42 and a first pattern 3a placed in between the first outer film 41 and the first inner film 42. Both the first outer film 41 and first inner film 42 are made of plastic. The first pattern 3a is pre-printed on a bottom surface 412 of the first outer film 41 and is visible from outside of the first outer film 41. The first inner film 42 has a top surface 421 which is heat laminated to the bottom surface 412 of the first outer film 41. The first pattern 3a is thereby protected from direct exposure to the outside of environment. A bottom surface 422 of the first inner film 42 is heat laminated to the top surface 10 and edge surfaces 12 of the foam core 1. In addition, the first outer film 41 is made of a transparent material so that the first pattern 3a is visible from outside of the slider.

A method for making the slider is described as follows: (1) extruding the first outer film 41 with a thickness in the range from 0.02 mm to 0.15 mm by an extrusion machine; (2) printing the first pattern 3a on the bottom surface 412 of the first outer film 41 using black and white printing or color printing techniques; (3) extruding the first inner film 42 with a thickness in the range from 0.01 mm and 0.15 mm; (4) spreading the molten first inner film 42 on the bottom surface 412 of the first outer film 41, providing the first inner film 42 not only is heat laminated to the bottom surface 412 of the first outer film 41 but also overlays the first pattern 3a; and (5) heating the bottom surface 422 of the first inner film 42 to molten conditions and pressing the top layer 4 to the top surface 10 and the edge surfaces 12 of the foam core 1. The process of combining the first outer film 41 and the first inner film 42 or combining the first inner film 42 and the foam core 1 is called heat laminating, alternatively heat fusion or heat sealing.

During the process of combining the top layer 4 and the foam core 1, the top layer 4 is placed on a hot mold (not shown). The mold surface has a plurality of embossments, when the mold surface covered by the top layer 4 is pressed against the foam core 1, concaves 40 are formed as shown in FIG. 3. That is, the first outer film 41 together with the first inner film 42 is embossed to define the concaves 40 in an exterior surface 411 of the first outer film 41. The concaves 40 are defined to enhance the area of contact between the top layer 4 and the foam core 1, and thereby increase the strength of the seal of the top layer 4 and the foam core 1. Furthermore, the concaves 40 enable the users to grab the slider with greater tenacity.

Figure 4:
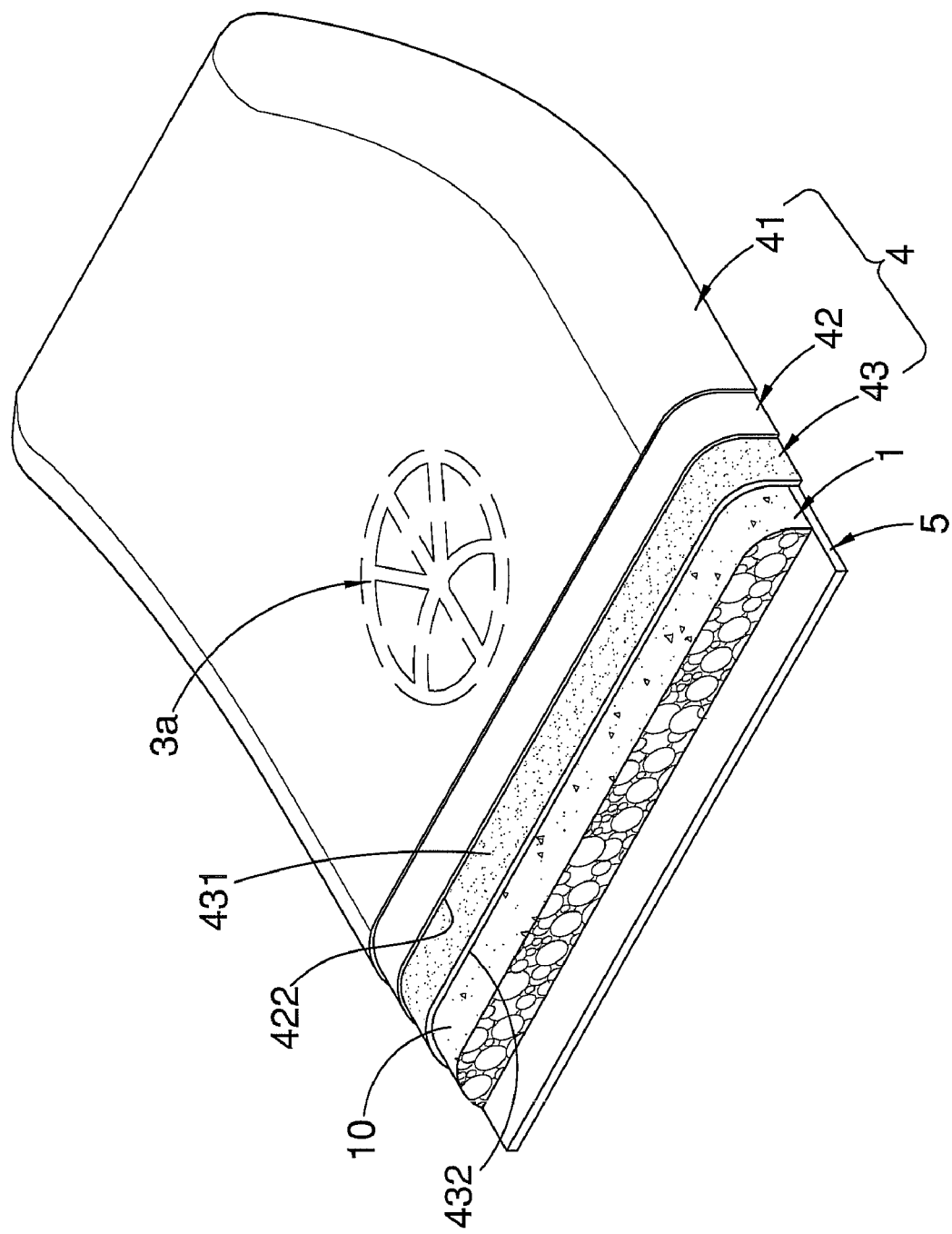
FIG. 4 is a cross sectional view of a slider according to a second embodiment of the present invention.

With reference to FIG. 4, a slider in accordance with a second embodiment of the present invention includes the entire structure of the FIG. 1 to FIG. 3, such as a foam core 1, a top layer 4 and a bottom layer 5. In this second embodiment, the top layer 4 includes a patterned laminate and a first polyethylene foam skin 43. The patterned laminate includes a first outer film 41, a first inner film 42 and a first pattern 3a placed in between the first outer and inner films 41, 42, as disclosed in the first embodiment. The first polyethylene foam skin 43 is interposed between the first inner film 42 and the top surface 10 and edges surfaces 12 of the foam core 1. In addition, the first polyethylene foam skin 43 has a top surface 431 being heat-laminated to the bottom surface 422 of the first inner film 42 and a bottom surface 432 being heat-laminated to the top surface 10 and edge surfaces 12 of the foam core 1. The first polyethylene foam skin 43 has a greater density than that of the foam core 1 and has a density in the range of 1.5 to 10 PCF. The first polyethylene foam skin 43 has smoother surfaces due to the lower density, and therefore improves the bonding strength among the high-density the top layer 4, the first foam skin 43 and the foam core 1 during the heat lamination process when compared to the case when the top layer 4 is directly bonded to the low-density foam core 1.

When subject to the heat lamination process, the first pattern 3a is therefore sandwiched between the first outer film 41 and the first inner film 42 with one side joined to the first outer film 41 and the other side joined to the first inner film 42. After heat lamination is completed, the pattern 3a is substantially the same with the one pre-printed on the outer film 41 before the heat lamination process. Thus the slider of the present invention provides a high resolution image thereon.

Figure 5:
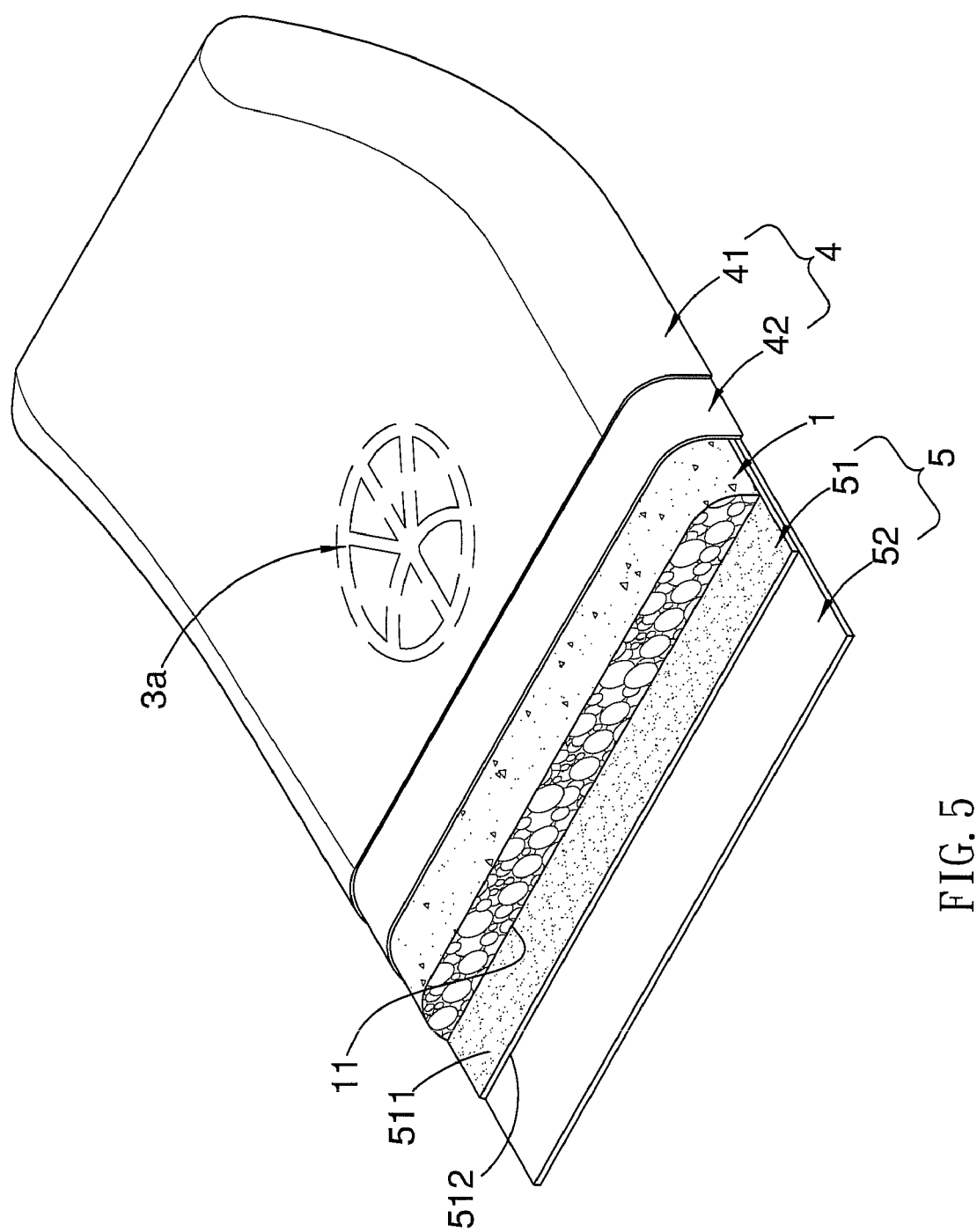
FIG. 5 is a cross sectional view of a slider according to a third embodiment of the present invention.

FIG. 5 is a slider in accordance with a third embodiment of the present invention, which includes all features of the first embodiment, such as a foam core 1, a top layer 4 and a bottom layer 5. In the third embodiment, the bottom layer 5 is a composite layer and comprises a second polyethylene foam skin 51 and a plastic board 52. The second polyethylene foam skin 51 has a top surface 511 being heat laminated to the bottom surface 11 of the foam core 1 and a bottom surface 512 being heat laminated to the plastic board 52. The second polyethylene foam skin 51 has a greater density than that of the foam core 1 and has a density in the range of 1.5 to 10 PCF.

A method for making the bottom layer 5 of the third embodiment is described as follows: (1) extruding the plastic board 52 with a thickness in range from 0.3 mm to 1.5 mm; and (2) spreading the molten plastic board 52 on the bottom surface 512 of the second polyethylene foam skin 51. Therefore, the plastic board 52 is tightly heat laminated to the second polyethylene foam skin 51. Thereafter, heating the top surface 511 of the second polyethylene foam skin 51 to a softened state and then laminating the bottom layer 5 to the bottom surface 11 of the foam core 1. The bottom layer 5 is tightly heat laminated to the polyethylene foam core 1.

Figure 6:
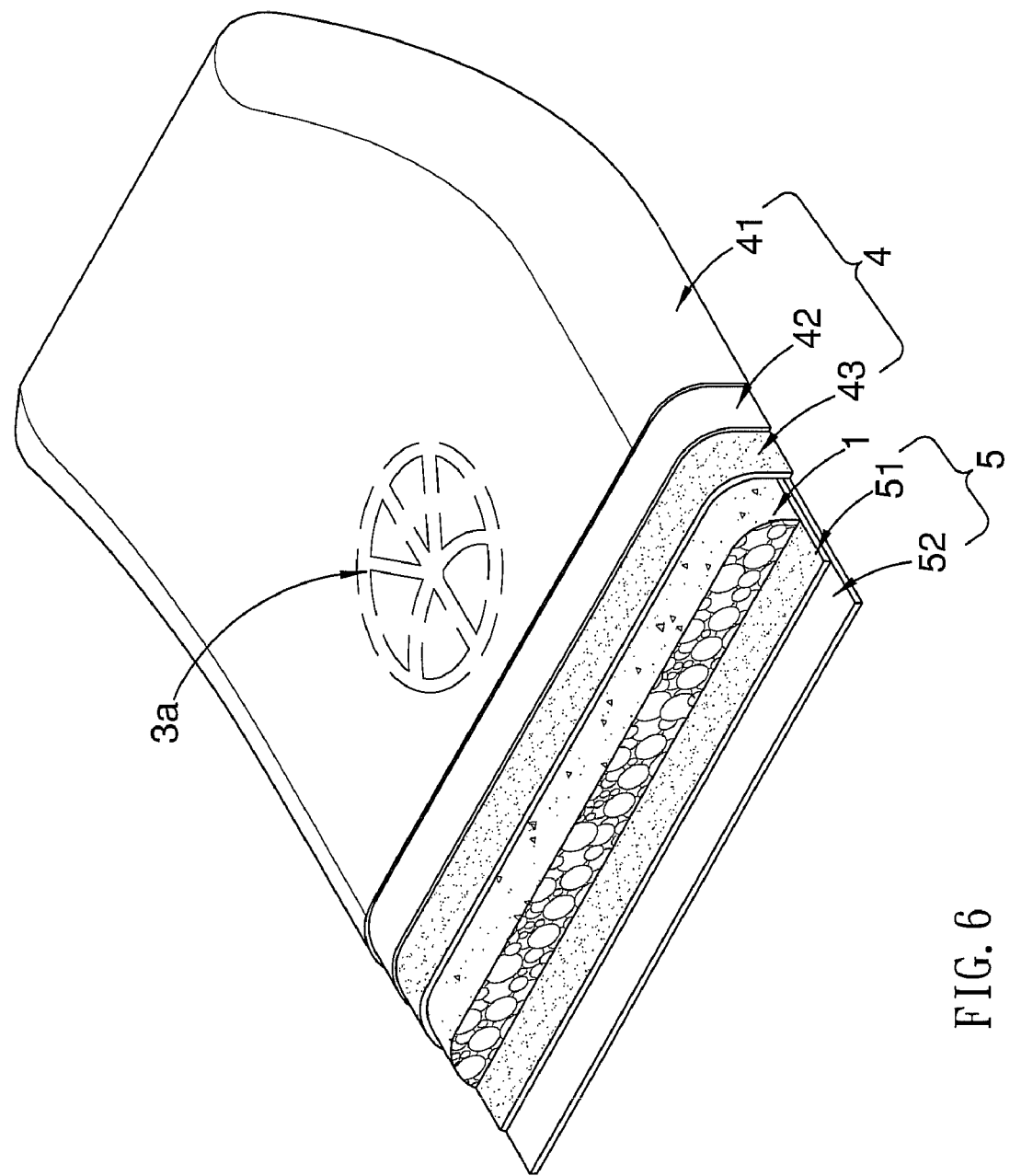
FIG. 6 is a cross sectional view of a slider according to a fourth embodiment of the present invention.

With reference to FIG. 6, a slider in accordance with a fourth embodiment of the invention comprises all the elements of the second embodiment. In the fourth embodiment, the bottom layer 5 further comprises a second polyethylene foam skin 51 and a plastic board 52 having a slippery bottom surface for gliding on waters, grounds or snows. The second polyethylene foam skin 51 has a top surface 511 being heat laminated to the bottom surface 11 of the foam core 1 and a bottom surface 512 being heat laminated to a top surface of the plastic board 52. The second polyethylene foam skin 51 has a greater density than that of the foam core 1 and has a density in the range of 1.5 to 10 PCF.

Figure 7:
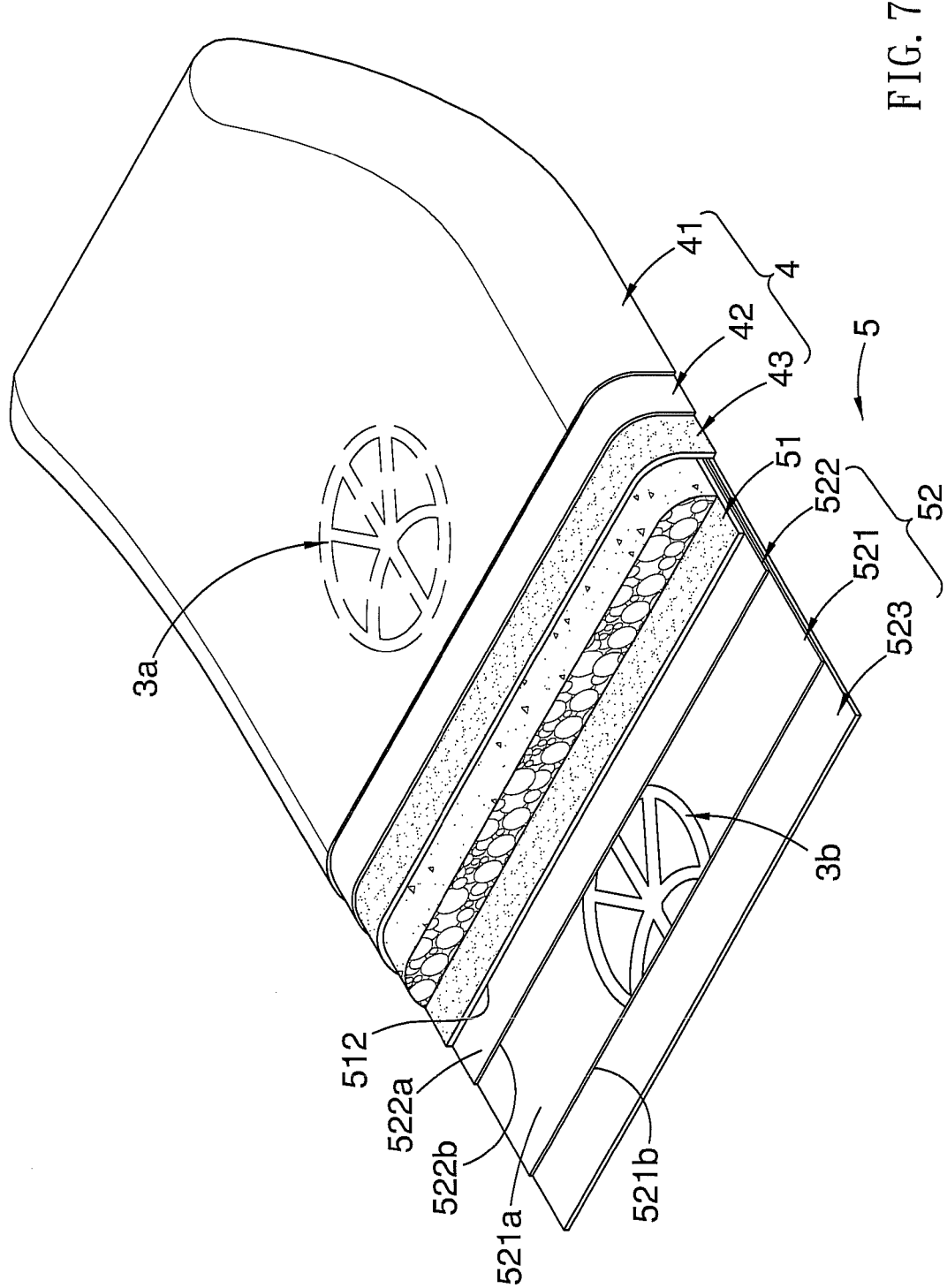
FIG. 7 is a cross sectional view of a slider according to a fifth embodiment of the present invention.

FIG. 7 is a slider in accordance with a fifth embodiment of this invention, which comprises all the elements of the fourth embodiment. In the fifth embodiment, the plastic board 52 includes a plastic plate 523 and a patterned laminate having a second pattern 3b, a second outer film 521 and a second inner film 522. The patterned laminate of the bottom layer 5 is similar to that of the top layer 4 and is bonded to the bottom surface 512 of the second polyethylene foam skin 51. Specifically, the second outer film 521, second inner film 522 and the plastic plate 523 are made of plastic. The second pattern 3b is printed on a top surface 521a of the second outer film 521 and is visible from outside of the second outer film 521. The second inner film 522 has a top surface 522a being heat laminated to the bottom surface 512 of the second polyethylene foam skin 51 and a bottom surface 522b heat laminated to the top surface 521a of the second outer film 521. The second pattern 3b is thereby protected from direct exposure to the outside of environment. The plastic plate 523 is bonded to a bottom surface 521b of the second outer film 521. In addition, the second outer film 521 and the plastic plate are both made of transparent material so the second pattern 3b is visible from outside of the slider.

Figure 8:
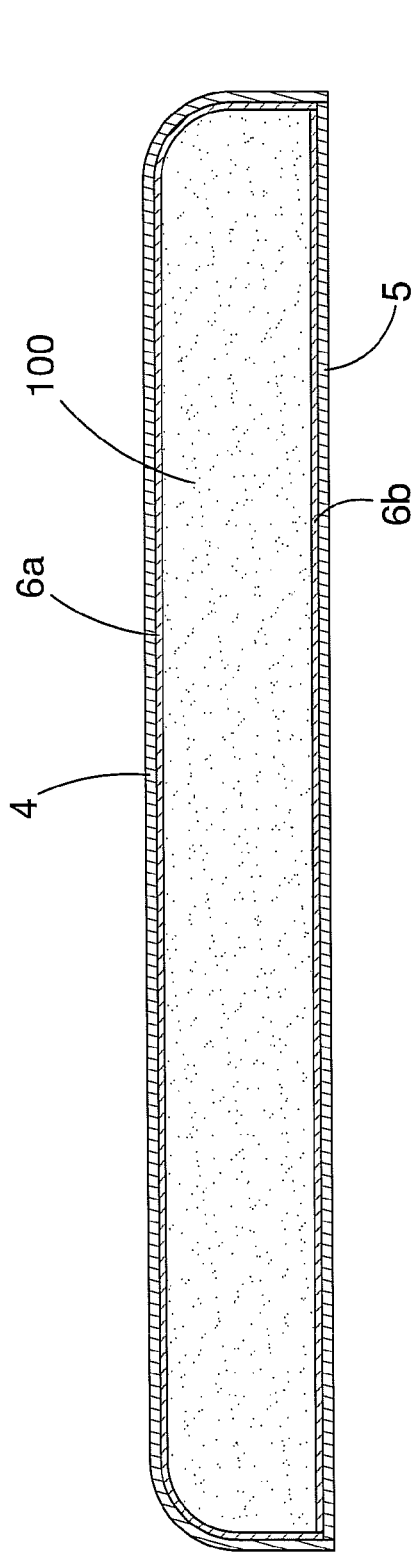
FIG. 8 is a cross sectional view of a slider according to a sixth embodiment of the present invention.

With reference to FIG. 8, a slider in accordance with a sixth embodiment of the invention includes a foam core 100 made of non-polyethylene materials, such as polystyrene and polypropylene materials and has a density in the range of 0.8 to 8 PCF. In the sixth embodiment, the slider further includes a top layer 4, a first bonding film 6a, a second bonding film 6b and a bottom layer 5. Polystyrene is inexpensive and easy to be extruded as the foam core 100. However, it is difficult to heat laminate polyethylene foam directly onto polystyrene foam. Therefore, the first bonding film 6a and the second bonding film 6b are used to overcome the lamination problems. In FIG. 8, the top layer 4 is heat laminated to the top and edge surfaces of the foam core 100 by the bonding film 6a. The bottom layer 5 is heat laminated to the bottom surface of the foam core 100 by the bonding film 6b.

Figure 9:
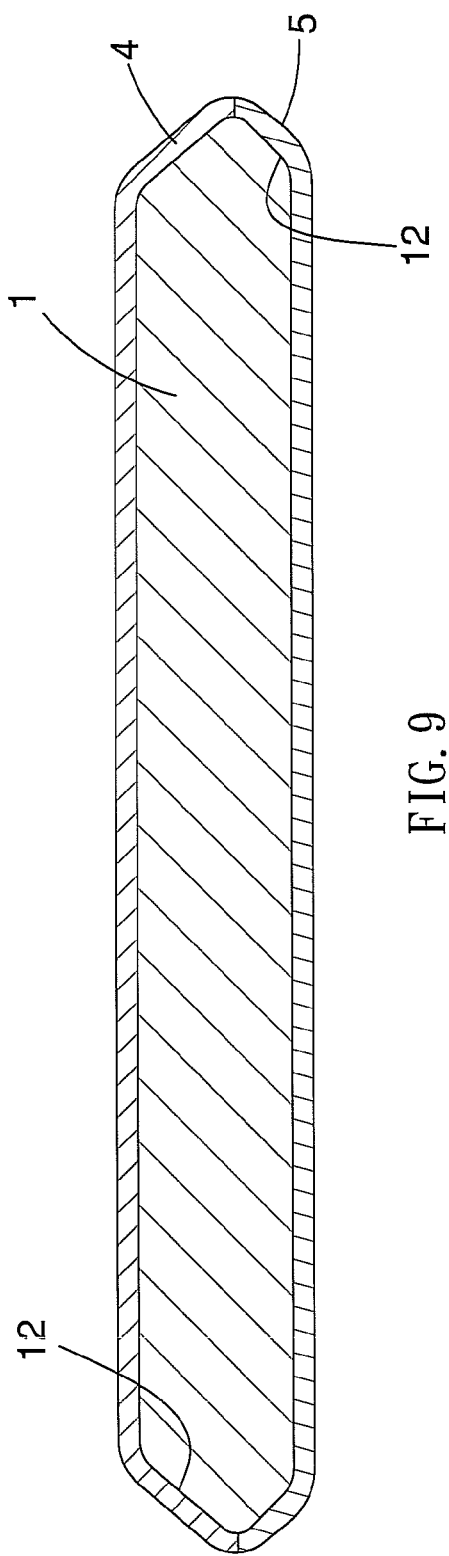
FIG. 9 is a cross sectional view of a slider according to a seventh embodiment of the present invention.

With reference to FIG. 9, a slider in accordance with a seventh embodiment of the invention comprises a foam core 1, a top layer 4, and a bottom layer 5. The top layer 4 is heat laminated to the top surface of the foam core 1 and extends around the upper half of the edge surfaces 12 of the foam core 1. The bottom layer 5 is heat laminated to the bottom surface of the foam core 1 and extends around the lower half of the edge surfaces 12 of the foam core 1. Therefore, the top layer 4 and bottom layer 5 are sealed together at edges. The structure of the seventh embodiment also applies to the above-mentioned embodiments.

Figure 10:
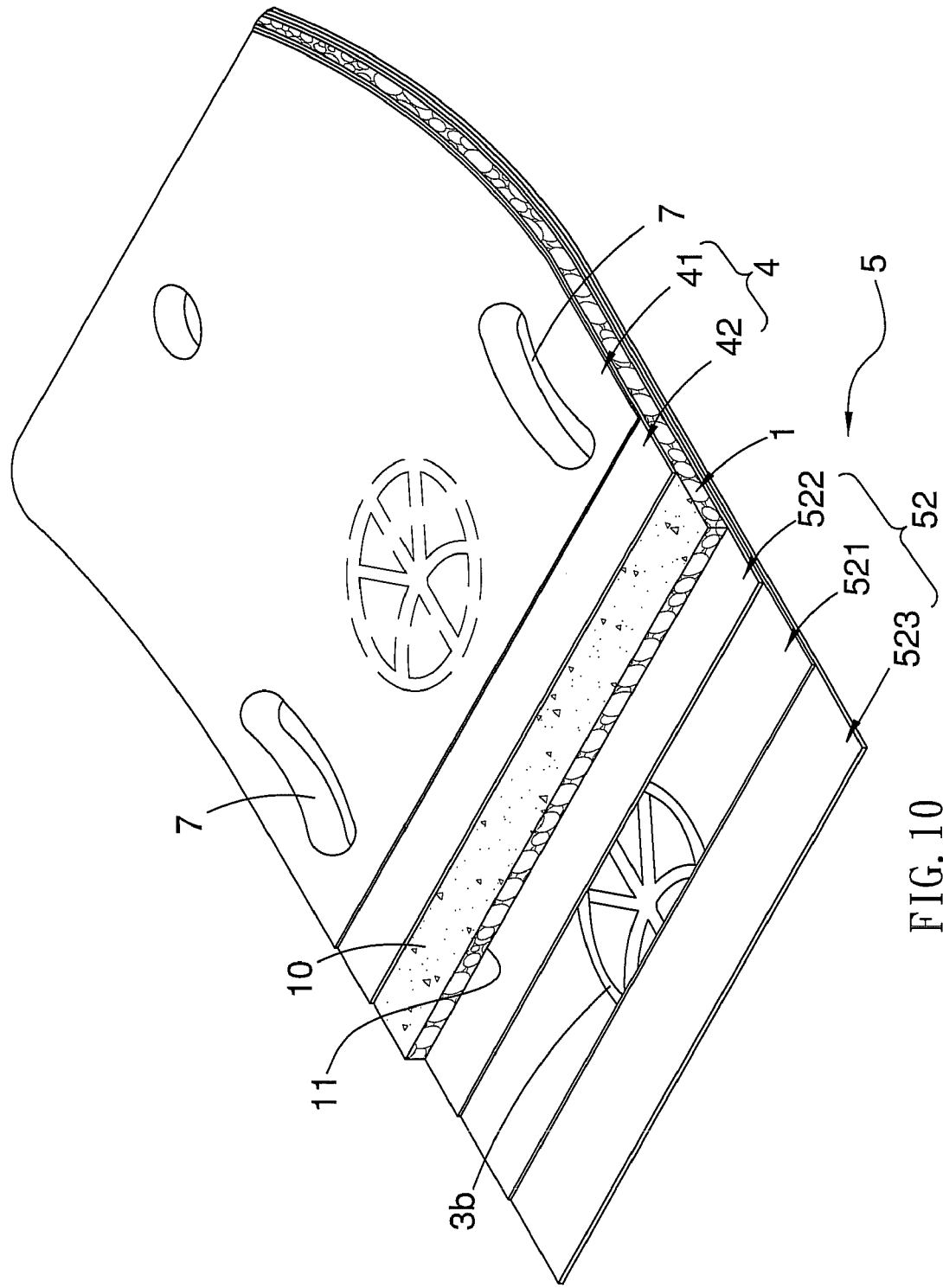
FIG. 10 is a cross sectional view of a slider according to an eighth embodiment.

With reference to FIG. 10, a slider in accordance with an eighth embodiment of the invention comprises a polyethylene foam core 1 having a density in the range of 1.5 to 10 PCF, a top layer 4, and a bottom layer 5. The polyethylene foam core 1 has a top surface 10 and a bottom surface 11. Both the top layer 4 and the bottom layer 5 are composite layers and the elements of the composite layers are shown in the above-mentioned embodiments. Furthermore, the eighth embodiment comprises two holes 7 defined through the slider for being handhold.

Accordingly, the top layer 4 and the bottom layer 5 protect the foam core 1 as well as the first pattern 3a and the second pattern 3b from erosion by exposure to ultraviolet light, moisture and abrasion. Furthermore, the first and second patterns 3a, 3b being visible from outside of the slider that attracts the users attentions.

The foregoing description is for purposes of illustration only and is not intended to limit the scope of the protection accorded this invention. The scope of protection is to be measured by the following claims, which should be interpreted as broadly as the inventive contribution permits.

What is claimed is:

1. A slider comprising:
   a foam core having a top surface, a bottom surface and edge surfaces;
   a first polyethylene foam skin having a bottom surface being laminated to the top and edge surfaces of the foam core;
   a first patterned laminate including an inner plastic film having a bottom surface being heat laminated to a top surface of the first polyethylene foam skin; an outer plastic film having a bottom surface joined to a top surface of the inner plastic film; and a pattern placed in between the inner and outer plastic films and being visible from outside of the outer plastic film, wherein the outer plastic film together with the inner plastic film is embossed to define concaves in an exterior surface of the outer plastic film;
   a second polyethylene foam skin having a top surface being heat laminated to the bottom surface of the foam core; and
   a second patterned laminate including an inner plastic film having a top surface being heat laminated to a bottom surface of the second polyethylene foam skin; an outer plastic film having a top surface being heat laminated to a bottom surface of the inner plastic film; and a pattern being placed in between the inner and outer plastic films and being visible from outside of the outer plastic film.

2. The slider of claim 1, wherein the foam core is made of polyethylene foam; each of the first and second polyethylene foam skins has a density greater than that of the foam core.

3. The slider of claim 2 further comprising a plastic plate having a surface being heat laminated to a bottom surface of the outer plastic film of the second polyethylene foam skin, wherein the pattern is visible from outside of the plastic plate.

4. The slider of claim 1, wherein the foam core is made of non-polyethylene foam; the first polyethylene foam skin is laminated to the top and edge surfaces of the foam core via a first bonding film; and the second polyethylene foam skin is laminated to the bottom surface of the foam core via a second bonding film.

5. The slider of claim 4 further comprising a plastic plate having a surface being heat laminated to a bottom surface of the outer plastic film of the second polyethylene foam skin, wherein the pattern is visible from outside of the plastic plate.

6. The slider of claim 1 wherein the pattern of the first patterned laminate is substantially the same before and after the first patterned laminate is heat-laminated to the first polyethylene foam skin.

7. A slider comprising:
   a polyethylene foam core having a top surface, a bottom surface and edge surfaces;
   a first polyethylene foam skin having a bottom surface being laminated to the top and edge surfaces of the foam core;
   a patterned laminate including an inner plastic film having a bottom surface being heat laminated to a top surface of the first polyethylene foam skin; an outer plastic film having a bottom surface joined to a top surface of the inner plastic film; and a pattern placed in between the inner and outer plastic films and being visible from outside of the outer plastic film, wherein the outer plastic film together with the inner plastic film is embossed to define concaves in an exterior surface of the outer plastic film;
   a second polyethylene foam skin having a top surface being heat laminated to the bottom surface of the foam core; and a plastic plate having a top surface being heat laminated to a bottom surface of the second polyethylene foam skin and a slippery bottom surface for sliding.

8. The slider of claim 7 wherein the pattern of the first patterned laminate is substantially the same before and after the first patterned laminate is heat-laminated to the first polyethylene foam skin.

9. A composite layer comprising:
a polyethylene foam skin; and
a first patterned laminate including an inner plastic film having a bottom surface being heat laminated to a top surface of the polyethylene foam skin; an outer plastic film having a bottom surface joined to a top surface of the inner plastic film; and a pattern placed in between the inner and outer plastic films and being visible from outside of the outer plastic film, wherein the outer plastic film together with the inner plastic film is embossed to define concaves in an exterior surface of the outer plastic film.

10. The composite layer of claim 9 further comprising a second patterned laminate including an inner plastic film having a top surface being heat laminated to a bottom surface of the polyethylene foam skin; a transparent outer plastic film having a top surface being heat laminated to a bottom surface of the inner plastic film; and a pattern being placed in between the inner and outer plastic films.

11. The composite layer of claim 10 further comprising a plastic plate having a top surface being heat laminated to a bottom surface of the outer plastic film and a slippery bottom surface for sliding, wherein the pattern is visible from outside of the plastic plate.

12. The composite layer of claim 9 further comprising a bonding film laminated to a bottom of the polyethylene foam skin so that the polyethylene foam skin is adapted to be heat-laminated to a non-polyethylene foam skin.

\* \* \* \* \*